G. B. Keeler,
Wrench.
N° 65,678.     Patented June 11, 1867.
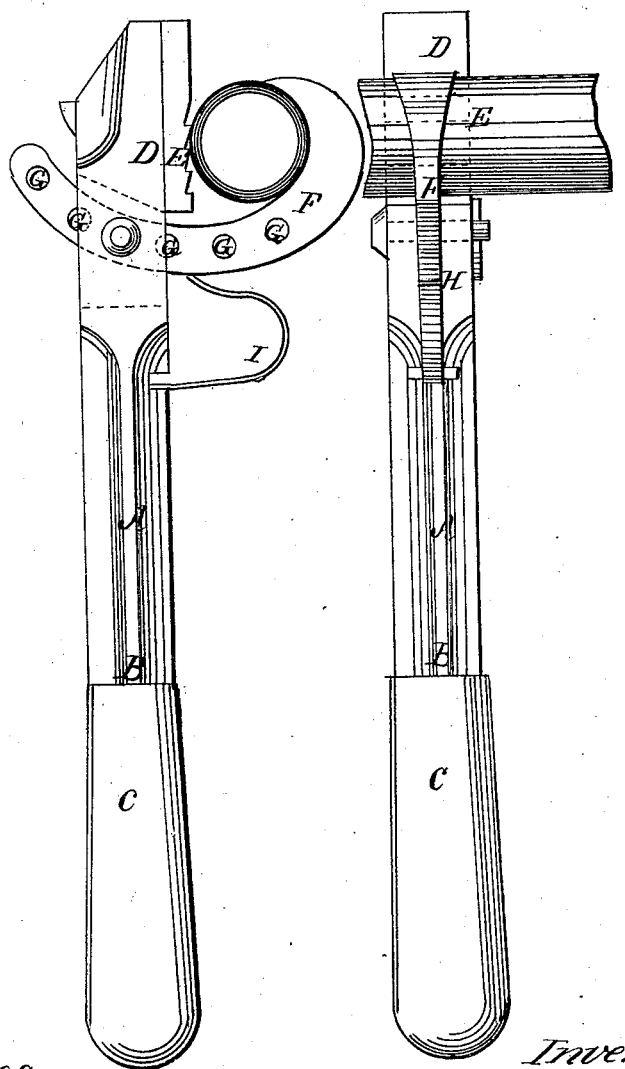

United States Patent Office.

G. B. KEELER, OF GREENWICH, CONNECTICUT.

Letters Patent No. 65,678, dated June 11, 1867.

IMPROVEMENT IN WRENCHES.

The Schedule referred to in these Letters Patent and making part of the same.

TO ALL WHOM IT MAY CONCERN:

Be it known that I, G. B. KEELER, of Greenwich, in the county of Fairfield, and State of Connecticut, have invented a new and improved Wrench; and I do hereby declare that the following is a full, clear, and exact description thereof, which will enable others skilled in the art to make and use the same, reference being had to the accompanying drawings, forming part of this specification.

The present invention relates to pipe-wrenches more particularly, and the wrench embraced in this invention consists of a straight shank or bar provided with a suitable handle at one end and a series of notches at the other, in combination with an adjustable swinging spring-hook, so hung to the said bar as to enable pipes of varying sizes to be grasped by the wrench. In the accompanying plate of drawings my improved wrench is illustrated—

Figure 1 being a side view of the same; and
Figure 2, an edge view.
Similar letters of reference indicate like parts.

A, in the drawings, represents a straight shank or bar which, at one end, B, is provided with a handle, C, and at its other, D, is notched or toothed along one edge, E. F, a hook provided with a series of holes, G, by one of which it is shown as hung in the slot H of the shank or bar A, so as to extend from the same to and along its notched or toothed side, with its hook end in front of the same. I, a bent spring secured to bar or shank A at one end, with its other free, and arranged to bear upon the edge of the hook F. Between the hook F and the notched portion of the shank A the pipe is placed, the spring I allowing the hook to open sufficiently therefor. When reacting it closes the hook upon the pipe and tightly binds it to and against the notched portion of the shank, so that by swinging the shank A around either to the right or left, the pipe will be turned in a corresponding direction.

I am aware of the patent of Mark Alcutt for an improved cant-hook, granted December 16, 1856, and I therefore do not claim any of the parts forming the subject-matter thereof.

I claim as new, and desire to secure by Letters Patent—

The shank or bar A, notched at one end, in combination with the adjustable spring-hook F, substantially as and for the purpose described.

G. B. KEELER.

Witnesses:
M. M. TODD,
SAMUEL KELLY.